Oct. 11, 193    M. P. GRAHAM ET AL    1,881,504
VIBRATION DAMPER
Filed June 13, 1928    2 Sheets-Sheet 1
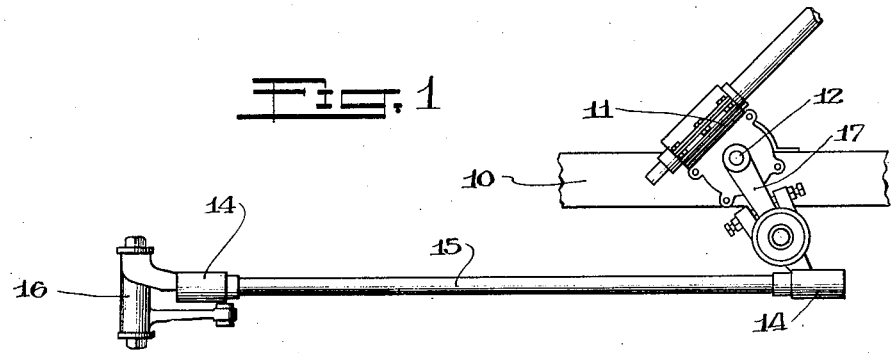
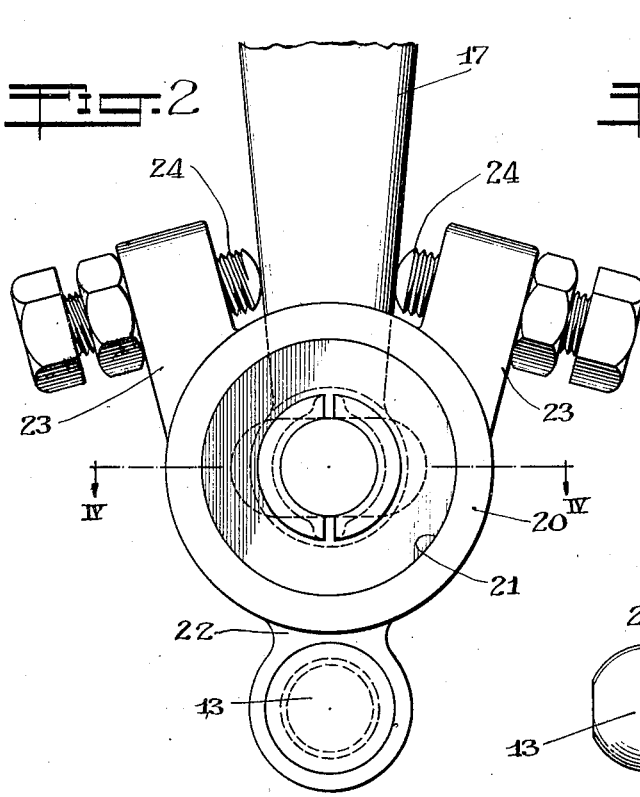
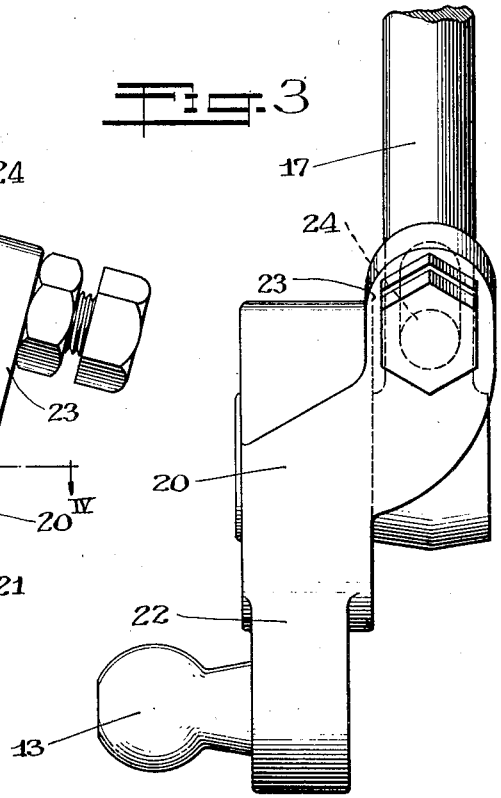
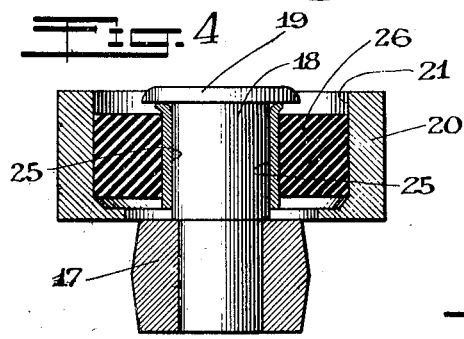
Inventors:
Matthew P. Graham
George H. Hufferd.
by Charles N. Hill Oct. 11, 1932.   M. P. GRAHAM ET AL   1,881,504
VIBRATION DAMPER
Filed June 13, 1928     2 Sheets-Sheet 2
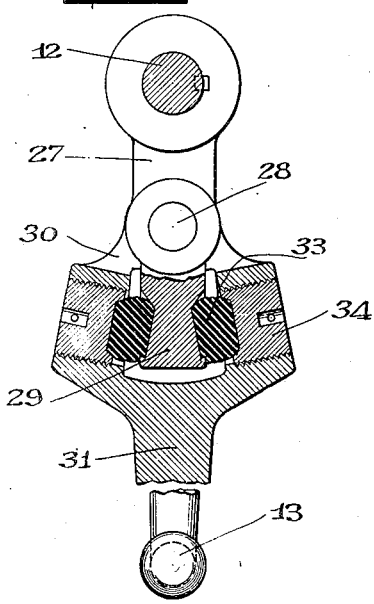
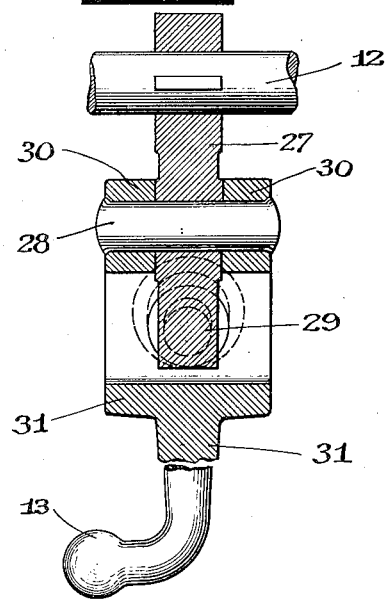
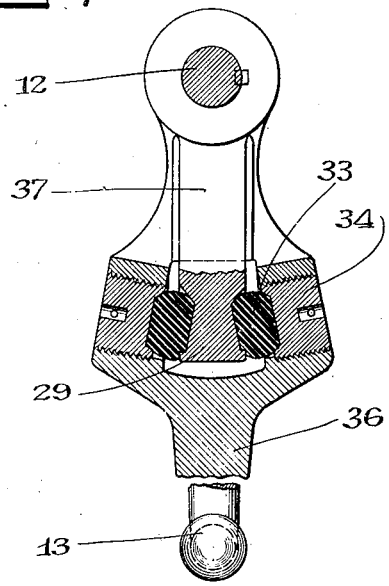
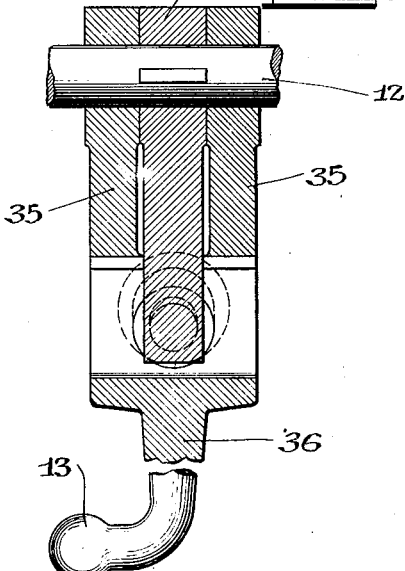
Inventors:
Matthew P. Graham
George H. Hufferd
by: Charles H. Hill
Attys:

Patented Oct. 11, 1932

1,881,504

UNITED STATES PATENT OFFICE

MATTHEW P. GRAHAM AND GEORGE H. HUFFERD, OF DETROIT, MICHIGAN, ASSIGNORS TO THOMPSON PRODUCTS, INC., A CORPORATION OF OHIO

VIBRATION DAMPER

Application filed June 13, 1928. Serial No. 284,939.

This invention relates to vibration dampers or shock absorbers for the steering linkage of automotive vehicles and has special reference to cushioning the road shocks ordinarily transmitted from the steering wheel to the drag link and arm of the steering gear.

It is an object of this invention to cushion the linkage against the transmission of shocks by the provision of non-metallic yielding connections on the linkage. As the steering gear arm and drag link handle twice the load of the tie rod, the conditions of service are more severe and differ also in character, as the drag link and its connections are directly responsible for the actual steering of the vehicle, and a failure thereof would result in a complete loss of control of the vehicle. Heretofore, drag links have been used having spring-backed ball seat bearings which yield under shock, but such springs are ineffectual to absorb or cushion the shocks because of the tendency to build up successive vibrations which develop into so-called "shimmy" or wheel wobble. It is accordingly an object of this invention to provide a steering gear arm having a limited range of movement opposed by non-metallic yielding buffers which act as shock absorbers.

It is another object of this invention to provide an inexpensive and reliable shock-absorbing steering gear arm which can be adjusted for wear as well as for its initial resistance to yielding.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary elevation of a steering linkage embodying one form of the present invention.

Figure 2 is an enlarged fragmentary detail of the steering gear arm of Figure 1.

Figure 3 is a side elevation of Figure 2.

Figure 4 is a section on the line IV—IV of Figure 2.

Figure 5 is a view, partly in section, of another embodiment of this invention.

Figure 6 is a vertical section at right angles to that of Figure 5.

Figure 7 is a partly sectional view of a third embodiment of this invention.

Figure 8 is a vertical section taken at right angles to that of Figure 7.

As shown on the drawings:

In Figure 1, the numeral 10 identifies a fragment of a vehicle frame on which is mounted a steering gear case 11, the shaft 12 of which receives the various steering gear arms embodying the present invention. These arms terminate in a ball stud 13 which engages in one of the ball joint housings 14 of a drag link 15, the other housing engaging a ball stud on an arm of a steering knuckle 16, on which a vehicle wheel is usually mounted.

In the embodiment of the invention shown in Figures 1 to 4, a lever or arm 17, somewhat shorter than the usual steering gear arm, is keyed or otherwise secured at one end to the shaft 12. The other end of this lever 17 is provided with an outstanding pin 18 having an outer shoulder or flange 19. A secondary lever 20 has a cylindrical housing 21 concentric with but larger than the pin, with a depending arm 22 carrying the usual ball end 13 for engagement with the drag link. The housing is closed at the rear except for an oblong aperture to admit the shank of the pin 18. Upwardly extending arms 23 are also formed thereon containing set screws 24 to adjustably engage the sides of the lever 17 at some distance above the axis of the pin. A two-piece or split metal bushing 25 contacts the pin, and the housing 21 contains a compressed elastic rubber ring 26 pressing the bushing against the pin.

With the structure so described and the set screws adjusted as shown in Figure 2, it will be evident that the secondary lever has no appreciable freedom of rotation on the pin 18, any shifting of the ball 13 relative to the axis of the lever 17 being due to a shifting of the pin off center in the rubber ring 26, the secondary lever really pivoting about the points of the set screws 24.

The form shown in Figures 5 and 6 resembles the previously described embodiment of the invention in principle of operation but not in structure. A lever 27 is secured at one end to the shaft 12 and carries a pivot pin 28 midway of its length, the lower end 29 of the lever projecting between the yokes 30 of a secondary lever 31, the yokes being pivoted on the pin 28. The lower end 32 of the lever 31 carries the usual ball end 13 for engagement with the drag link. The lower end 29 of the lever 27 is recessed on either side to receive rubber cylinders 33, which are adjustably compressed by plugs 34 threaded into suitable recesses in the secondary lever.

The third form of the invention pivots the yokes 35 of a secondary lever 36 on the shaft 12 on either side of a lever 37 keyed thereto, the secondary lever terminating in a ball and having the rubber cylinders 33 and adjustable plugs 34, previously described in connection with Figure 5. The difference between Figures 5 and 7 lies largely in the increased range of yielding movement permitted in Figure 5 by the shorter lever arm between the rubber cylinders and the pivot of the secondary lever.

In the normal operation of the steering linkage as a whole, the shock absorbing structure of the steering gear arm materially reduces the "kick" at the steering wheel when a road wheel strikes a bump or drops into a rut. The non-metallic nature of the buffer elements also cushions or prevents the transmission of vibrations from the axle system to the steering column and wheel. It is desirable to set up the rubber buffer elements with sufficient initial compression or pressure to make a firm connection sufficient for ordinary steering conditions, the yield point being so adjusted as to take care of abnormal shocks, while the non-metallic nature of the buffers also respond sufficiently to smooth out even minor vibrations.

It will thus be seen that we have invented an inexpensive and efficient method of dampening and absorbing shocks on the steering linkage, thus not only making driving easier and more comfortable, but also dampening or restraining wheel wobble.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In a steering connection between a gear shaft and a drag link, a lever fixedly secured at one end to said gear shaft, a bifurcated lever pivotally connected at its ends to said gear shaft and to said drag link, the free end of said first lever extending into the bifurcation of said second lever and resilient means held under adjustable compression between the free end of said first lever and said bifurcated lever to permit relative angular displacement of the axis of the first lever with respect to the axis of the second lever.

2. In a steering connection between a gear shaft and a drag link, a lever fixedly secured to said gear shaft, a bifurcated lever pivotally connected at its ends to said gear shaft and to said drag link, the free end of said first lever extending into the bifurcation of said second lever, said free end having recesses in the sides thereof, the bifurcation of said second lever having cooperating recesses opposed to the recesses in said first lever and resilient means held under adjustable compression mounted in the opposed recesses of said levers to permit relative angular displacement of the axis of said first lever with respect to the axis of said second lever.

3. In a steering connection between a gear shaft and a drag link, a lever fixedly secured to said gear shaft, a bifurcated lever pivotally connected at its ends to said gear shaft and to said drag link, the free end of said first lever extending into the bifurcation of said second lever, said second lever having apertures in the bifurcation thereof, plugs threaded into said apertures, the free end of said first lever having recesses in the sides thereof, the inner ends of said plugs having cooperating recesses opposed to said first named recesses and resilient blocks positioned in said recesses and held under compression by said adjustable plugs to permit relative angular displacement of the axis of said first lever with respect to the axis of said second lever.

In testimony whereof we have hereunto subscribed our names.

MATTHEW P. GRAHAM.
GEORGE H. HUFFERD.